[11] 3,631,713

| | | |
|---|---|---|
| [72] | Inventors | En_____ |
| | | Oak Park; |
| | | Rolf K. Mueller, Brighton, both of Mich. |
| [21] | Appl. No. | 749,637 |
| [22] | Filed | Aug. 2, 1968 |
| [45] | Patented | Jan. 4, 1972 |
| [73] | Assignee | The Bendix Corporation |

[54] EARLY DETECTION OF METAL FATIGUE WITH A COHERENT OPTICAL CROSS-CORRELATION PROCESS
8 Claims, 2 Drawing Figs.

[52] U.S. Cl. .................................... 73/67.3,
 73/88 R, 350/3.5
[51] Int. Cl. ..................................... G01m 7/00
[50] Field of Search ........................... 356/209,
 212, 71; 250/216, 217, 219 DF; 73/67.5 H, 71.3,
 88 A, 67.3; 350/3.5

[56] References Cited
UNITED STATES PATENTS
3,435,244  3/1969  Burckhardt et al. ..........  356/71 X
OTHER REFERENCES
Leith et al., " Holograms: Their Properties and Uses,"
1965, pp. 3-6
_____ aphic Technique Recognizes Fingerprints," Laser Focus, June 1967, pp. 18-23

*Primary Examiner*—Charles A. Ruehl
*Assistant Examiner*—John P. Beauchamp
*Attorney*—Plante, Hartz, Smith & Thompson ABSTRACT: A process for early detection of metal fatigue by coherent optical cross correlation of light from a test surface at time $t_k$ with a holographic filter of the same test surface made at an earlier point in time $t_o$. Early indication of fatigue is evidenced by minute translational displacement of the test surface's microstructure at time $t_k$ with respect to the hologram of the same test surface made at an earlier time $t_o$. The setup includes a spherical lens to produce the Fourier transform of the image of the test surface both for making the holographic reference filter and for the subsequent cross-correlation test. Light passing through the holographic reference filter during cross correlation is converted to a substantially DC voltage by conventional photoelectrical techniques. A decrease in correlation, indicating the beginning of fatigue, is read out directly as a decrease in the DC voltage. The method is one shot noncontacting technique which is statistical in nature and can thus test relatively large surfaces, like an area of an airframe 2 feet square, in a single test.

PATENTED JAN 4 1972

3,631,713

INVENTORS
EMANUEL MAROM
ROLF K. MUELLER

BY Thomas J. Plante
ATTORNEY

EARLY DETECTION OF METAL FATIGUE WITH A COHERENT OPTICAL CROSS-CORRELATION PROCESS

BACKGROUND OF THE INVENTION

1. Field of Invention

This invention relates to nondestructive testing of materials and more specifically to the early detection of fatigue in metals. Detection of fatigue in metal parts is important because fatigue failures are usually sudden and catastrophic. For example, fatigue failure in a metal airplane propeller might take the form of a propeller blade simply breaking off without any prior bending or other antecedent evidence of weakness. The catastrophic nature of fatigue failures makes early detection of fatigue stress especially important so that preventive measures can be taken in advance.

2. Description of the Prior Art

Most methods for detecting impending fatigue failure are based on the fact that the failure is preceded by the development of localized defects on the surface microstructure of metal parts such as slip bands, microextrusions or cracks. Hence, these approaches consist of directly observing such surface defects on specially prepared surfaces or of inferring the presence of these defects by acoustical or infrared scanning techniques. These methods are elaborate, time consuming and are able to detect fatigue only in the very late stages of its development. A further drawback is that microscopic inspection is capable of covering only small surface areas at one time.

The fatigue detection approach of this invention is based on the fact that fatigue stress in the metal part is preceded by small relative displacements of the surface microstructure in the fatigue stressed area with respect to the condition of the original surface microstructure with no fatigue stress. The present invention is a technique for detecting these small changes in surface microstructure in the stressed area by means of optical cross correlation using coherent light. The cross-correlation process detects the loss of correlation between the surface containing fatigue stress at time $t_k$ and the same surface in its initial state at time $t_o$. Because the cross correlation is done with coherent light, small relative displacements in the surface microstructure of the stressed area result in a substantial loss of correlation, giving an early warning of impending fatigue failure.

Since the method is statistical in nature, large surface areas can be tested on a one-shot basis. The method is faster than conventional techniques because of the larger surface areas covered and because the method is noncontacting so it does not require specially prepared surfaces. Rather, the method detects fatigue by comparison of optically processed reflections from the test surface observed at different points in time.

Two published articles disclose optical techniques for nondestructive test purposes. The first, entitled *Holograms: Their Properties and Uses*, by Emmett N. Leith and Juris Upatneiks appeared in proceedings of the Tenth Technical Symposium of the Society of Photo-Optical Instrumentation Engineers (S.P.I.E.) held on Aug. 17, 1965 at San Francisco, California. In the section of this paper entitled "Hologram Interferometry", the authors discuss the fact that the image produced by a hologram is a highly exact replica of the object. When the surface of the object and the image produced by the hologram are exactly lined up, interference fringes will be produced by small deformations in the object. For example, deformations caused by stressing the object will produce interference fringes because the slight difference between the object and the holographic image results in interference between the two, producing fringes in the nonmatching areas.

The authors of the above article also note that Stetson and Powell, (*Journal of the Optical Society of America*, 55, 612, 1965, Abstract), have used this holographic interferometry technique as a means of strain measurement. An article by K. A. Haines and B. P. Hildebrand in the Apr., 1966 issue of *Applied Optics*, (Vol. 5, No. 4) at page 596 also discusses the method of superimposing the holographic image of an object onto the same object under stress to produce interference fringes. It should be noted that while these articles refer generally to the field of nondestructive testing by coherent optical means, they pertain specifically to hologram interferometry. The present invention, by contrast, is an optical cross-correlation process whereby light from the test surface illuminated with the coherent light at time $t_k$ is optically compared with the hologram of the same test surface made at an earlier time $t_o$. The optical comparison is obtained by superimposing optically processed light from the test surface (coherently illuminated) onto the holographic filter. A cross correlation of the two light patterns is then directly read out as the intensity of the light passing through the holographic filter; that is, the closeness of match determines the amount of light which gets through the filter. Interference patterns are used to construct the holographic filter but there is no interference phenomena in the cross-correlation test and no fringes are produced.

Other references which are also relevant prior art for this invention are contained in the following three articles by E. N. Leith and J. Upatnieks entitled (1) "Reconstructed Wavefronts and Communication Theory" *Journal of the Optical Society of America*, Oct. 1962; (2) "Wavefront Reconstruction with Continuous-Tone Objects", *Journal of the Optical Society of America*, Dec. 1963; (3) "Wavefront Reconstruction: Diffused Illumination in Three Dimensional Objects", *Journal of the Optical Society of America*, Nov. 1964.

SUMMARY OF THE INVENTION

In the noncontacting fatigue detection technique of the present invention, the reference filter is made of the test surface in advance of the cross-correlation tests, at some time $t_o$, (perhaps when the surface has just been manufactured). This reference filter stores the optically processed reflection from the coherently illuminated test surface at time $t_o$. At the later testing time $t_k$, the same surface is again illuminated with coherent light, and the reflection is optically processed in the same manner as it was for originally constructing the reference filter. Then the two patterns are compared at time $t_k$ to determine the degree of correlation between them. If there has been no change in the structure of the test surface, the two patterns will show no decrease in correlation. If, however, there has been even a minute translational displacement in the surface microstructure at testing time $t_k$ with respect to the position of the surface structure at initial time $t_o$, the displacement will produce a noticeable decrease in correlation.

Because the patterns of surface phenomena are so precise when made with coherent light, the type of translational displacement of the surface microstructure which occurs when visible cracks begin to appear are so great that they cause a dramatic decrease in correlation between the two patterns. Smaller precrack stresses also produce a significant decrease in correlation; thus, they give warning of the fatigue stress much earlier than conventional crack-search methods which must await the formation of visible cracks.

In one setup constructed to implement the detection technique the reference filter was constructed in the following manner. First, the test surface was illuminated with laser light at time $t_o$; second, the reflection from the coherently illuminated test surface was passed through a spherical lens to produce the Fourier transform of this reflection at the focal point on the back side of the lens and focus it on a photographic plate positioned there; third, a portion of the laser beam was split off and directed by mirrors so that it struck the same photographic plate at an incident angle $\phi$. This second beam is called the reference beam.

The Fourier transform of the illuminated test surface (at $t_o$) which is focused on the photographic plate then interferes with the laser reference beam striking the same plate at angle $\phi$. This photographic plate records the pattern produced by the two interfering coherent wave fronts. The plate, when photographically processed, is a hologram of the Fourier transform of the test surface at time $t_o$. This hologram is sometimes referred to hereinafter as the holographic reference filter.

At a point in time shortly after the filter is made, say $t_1$, the same optical setup which was used to make the holographic reference filter at $t_o$ is used again for the cross-correlation test. The object is reilluminated with coherent light in the same manner; the reflection of the test surface is again Fourier transformed with a spherical lens and focused on the holographic reference filter positioned at the back focal point of the spherical lens (in the same position as the photographic plate was originally positioned to make reference filter). The reference beam used previously to make the holographic filter is blocked. If the surface microstructure of the test surface at time $t_1$ has not changed since $t_o$ the Fourier transform of the illuminated object and the interference pattern stored on the filter will show the highest degree of correlation. This cross correlation can be directly read out as light intensity passing through the filter. The light intensity can then be converted to a DC voltage by conventional photoelectrical means and read out on a DC voltmeter. This DC voltage, which corresponds to the highest degree of correlation between the test surface and the reference filter, may be used as a standard or high water mark against which any subsequent decreases in correlation can be measured.

Then, at still later time $t_k$, when the test surface is rechecked in the above manner, small translational displacements of surface microstructure which have occurred (such as those which precede the visible cracks which occur prior to fatigue failure) will cause a decrease in correlation. This is due to the fact that the Fourier transform of the reilluminated one-shot will not correlate as well with the pattern stored in the holographic reference filter. The resulting decrease in the intensity of the light passing through the filter will be converted into a correspondingly lower voltage. The drop in voltage from high correlation norm crack-search $t_1$ is an accurate measurement of the extent to which fatigue stress has progressed.

Several advantages of the above cross-correlation fatigue detection technique are apparent. First, the coherent optical correlation measurements provide a microscopic tool (a 0.6 wavelength was used in one embodiment) that averages all surface variations occurring within the illuminated area. Second, the statistical nature of the coherent optical technique makes it possible to test relatively large surface areas in a simple, one-shot process with microscopic precision. Third, the method is a real time, nondestructive and noncontacting test method which makes it possible to inspect surfaces in actual field operation. Fourth, the microscopic nature of the measurements enables detection of impending fatigue much earlier than conventional crank-search methods. Finally, the cross-correlation technique is much faster than the conventional crack-search methods. For example, in one test in which the vibrated samples were tested both by the cross-correlation process and by microscopic inspection of the etched surface for cracks; the time required for microscopic inspection of the surface area of the vibrated sample was nearly 10 hours, while the optical correlation process took less than 1 hour including the time required to expose and process the photographic plate to make the reference filter.

Further objects, features and advantages of this invention will become apparent from a consideration of the following description, the appended claims and the accompanying drawing in which:

FIG. 1 is a diagrammatic top view of one form of apparatus capable of carrying out the method of this invention; and FIG. 2 is a graph of the normalized autocorrelation light intensity in percent plotted as a function of the vibrational running time in minutes for an actual test sample; the scales for both the light intensity and the vibrational running time being logarithmic.

DESCRIPTION OF THE PREFERRED EMBODIMENT

Figure 1:
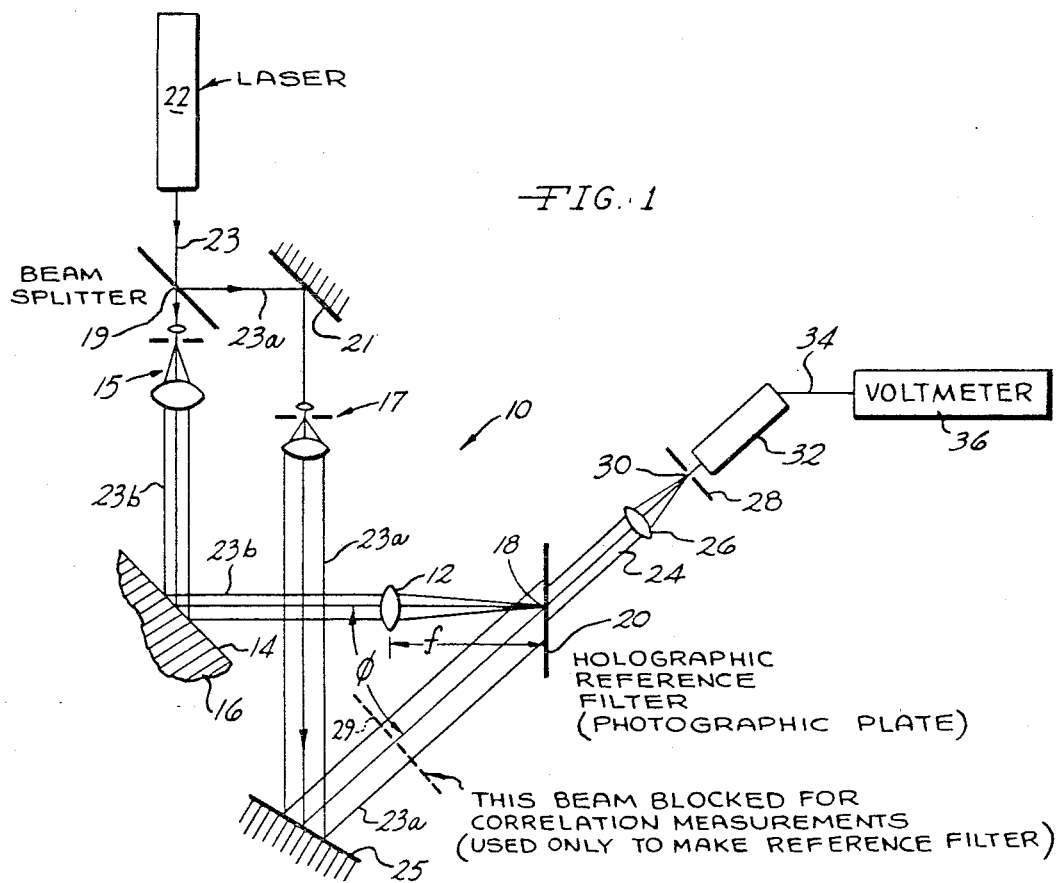

With reference to the drawing, one form of apparatus for carrying out the method of this invention is indicated generally at 10 in FIG. 1. The apparatus 10 is used both to make, at an initial time here designated as $t_n$, a holographic reference filter, indicated at 20, as well as to perform the subsequent cross-correlation test at a later time $t_k$. During the cross-correlation test, the only change in the apparatus 10 is the blocking of a reference beam 23a which was used initially for making the filter.

The apparatus 10 includes a laser 22 having a beam 23 directed at a conventional beam splitter 19 which splits beam 23 into two beams 23a and 23b. Beam 23a, hereinafter referred to as the reference beam, is directed from beam splitter 19 to a fixed mirror 21 which reflects it toward a conventional beam spreading unit 17. After passing through unit 17, the reference beam 23a, now widened, is directed to fixed mirror 25. Mirror 25 reflects beam 23a toward a photographic plate positioned where the filter 20 is shown in FIG. 1 so that the beam 23a strikes the plate at an angle $\phi$.

As will more clearly appear hereinafter, after the photographic plate has been exposed to the appropriate interference pattern and photographically processed, the resulting holographic reference filter 20 is placed as shown in FIG. 1 where it will act as the reference filter during the subsequent cross-correlation test.

Beam 23b, hereinafter referred to as the test surface illumination beam, passes through beam splitter 19 and into a conventional beam spreading unit 15 like the unit 17. After passing through the unit 15, the beam 23b, now widened, is directed at the test surface 14 of an object 16. Test surface 14 reflects beam 23b toward transform lens 12 which focuses beam 23b at a point 18 on the photographic plate positioned where the filter 20 is shown in FIG. 1.

One of the fundamental phenomena which enables data to be usefully processed by optical means is the fact that the light distribution in the back focal plane of a lens represents a good approximation of the Fourier transform of the wave front imposed on the front focal plane of the lens. Referring to FIG. 1, transform lens 12 is positioned at a distance $f$, equal to the focal length of lens 12, from the illuminated test surface 14. At point 18, the back focal plane of lens 12, a wave front $H(u,v)$ on beam 23b appears. Wave front $H(u,v)$ is a very close approximation to the Fourier transform of the wave front $h(x,y)$ reflected from illuminated test surface 14.

When the photographic plate located where the filter 20 is shown is exposed simultaneously to the wave front $H(u,v)$ on beam 23b and the plane wave on reference beam 23a (both from laser 22 having wavelength $\lambda$), an interference pattern is produced on and recorded by the photographic plate. The plate is then photographically processed. The interference pattern recorded on the processed photographic plate is a hologram of the wave front $H(u,v)$, the Fourier transform of the wave front $h(x,y)$ reflected from test surface 14.

This hologram is then placed at point 18 (in the same position as the original photographic plate) and is used as the holographic reference filter for the subsequent cross-correlation test. This filter has the property that when illuminated with any wave front $W(u,v)$ an output wave front, expressed mathematically by the quantity $[W(u,v) H^*(u,v)]$ will appear on an output beam 24 from filter 20 as viewed from angle $\phi$. In this notation, $H^*(u,v)$ is the complex conjugate Fourier transform of $H(u,v)$, and $\phi$ is the incidence angle of the reference beam 23a used to make the filter 20. However, the angle $\phi$ is also the angle of view for sensing output beam 24.

During the cross-correlation tests, the filter 20 is placed as shown in FIG. 1 and beam 23a is blocked by a suitable beam blocking element 29 shown in broken lines in FIG. 1. The output beam 24 from reference filter 20 is Fourier transformed by relay lens 26 and passed through a pinhole 30 in an element 28 located in the back focal plane of the lens 26. The intensity of output beam 24 registers on a photomultiplier 32 which converts it to a substantially DC output voltage appearing in conductor 34 and read out on voltmeter 36. Thus, the hologram, when used as filter 20, performs the operation of multiplying the complex conjugate Fourier transform $H^*_o(u,v)$ of the microstructure $h(x,y)$ of the original test surface 14 at time $t_o$ with any wave front imposed on the input side of filter 20. In this case, the input wave front is $H_k(u,v)$ which is from the Fourier transform of the wave front $h_k(u,v)$ reflected from the same test surface at a later time $t_k$.

Thus, when the filter 20 receives as an input Fourier transform $H_k(u,v)$, the wave front reflected from the coherently illuminated test surface at time $t_k$, a product of the two wave front $H_k(u,v) \cdot H^*_o(u,v)$ appears in the output beam 24 of the filter 20. Mathematically, it can be shown that the product wave front $H_k(u,v) \cdot H^*_o(u,v)$ is the Fourier transform of the cross-correlation function $C_{ok}$.

By Fourier transforming the output beam 24 with a second lens 26, the Fourier transform of the Fourier transform of $C_{ok}$, that is the cross-correlation function $C_{ok}$ itself, is obtained as the light distribution in the plane of the element 28, which is the plane of the back focal length of the second lens 26. If a small aperture 30 is placed at point 30 in element 28, the light intensity corresponding to the cross-correlation function $C_{ok}$ can be sensed and converted to a substantially DC voltage with the photomultiplier 32. The output voltage of the photomultiplier 32 in conductor 34 is then read out as a voltage on voltmeter 36. This voltage, corresponding to the cross-correlation function $C_{ok}$, is a measure of the deviation of the test surface 14 microstructure at time $t_k$ from the condition of the same surface microstructure at the initial time $t_o$.

Figure 2:
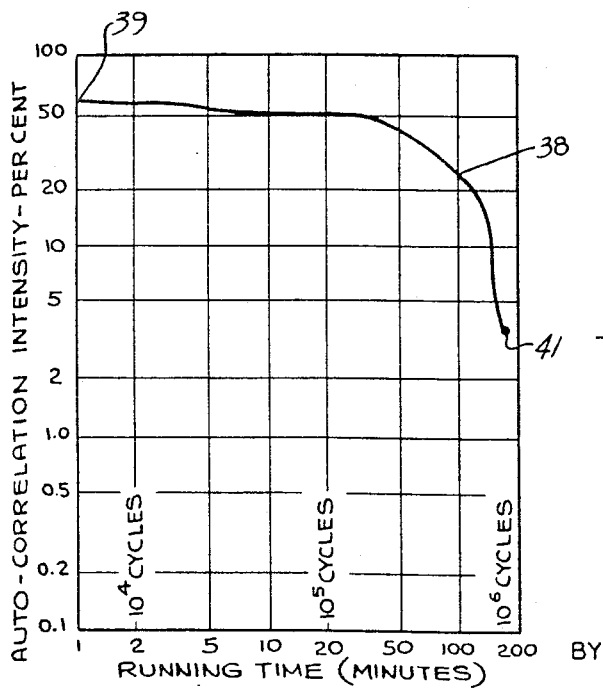

An example of the test results obtained by the fatigue an imperfect lineup between the method described above is shown in FIG. 2. The graph in FIG. 2 is a plot of the autocorrelation light intensity in percent plotted as a function of running time in minutes, the scale of both axes of the graph being logarithmic. The autocorrelation intensity in percent is a normalized function of the output voltages from voltmeter 36 obtained during the test. The actual voltages are normalized to the maximum voltage output obtained at time $t_1$. As mentioned before, the decrease in correlation is caused by the small translational displacements of the microstructure of test surface 14 which produce an imperfect lineup between the Fourier transforms of the light reflected from illuminated surface 14 at $t_k t_o$ which is stored in the filter 20. The resulting poor alignment of the two patterns causes a decrease in the intensity of output beam 24 which registers as a lower voltage on voltmeter 36.

This phenomenon can be seen generally in FIG. 2 which shows the autocorrelation intensity (which is proportional to the cross-correlation function) plotted against running time for a 1018 cold-rolled steel specimen. The specimen was a flat sample 6 inches in length made according to A.S.T.M. standards. The sample was positioned vertically in a vise and caused to vibrate by an electromagnet tuned to a frequency near the resonant frequency of the specimen for the indicated running time.

Correlation measurements were taken by placing the steel sample in the position of object 16 in the setup of FIG. 1 so that its flat surface was in the plane 14.

The correlation voltage readouts obtained from these measurements were the basis for calculating the percent autocorrelation intensity shown as the ordinate in the graph of FIG. 2. In general, the graph shows a decrease in correlation (that is, an increase in the amount of change in the microstructure of surface 14 from its condition at $t_o$) as the steel specimen is subjected to more vibrations over a period of time.

The vibration of the sample was terminated when microscopic inspection revealed a visible crack or other surface deformity in the flat surface of the sample. The time at which the vibration of the sample was terminated, shown as point 41 in FIG. 2, was close to 200 minutes or $10_6$ vibrational cycles after startup. With conventional fatigue detection techniques, successful detection of fatigue stress is indicated by the discovery of a surface deformity such as a visible crack on microscopic inspection of the sample's surface. When such a surface deformity was observed microscopically during this test at the time indicated by point 41, the test was terminated. Thus, the graph in FIG. 2 indicates the comparative improvement in fatigue detection with the optical method of this invention over conventional fatigue detection techniques.

For example, point 38 on the graph in FIG. 2 corresponds to 100 minutes of vibrational running time. The correlation intensity at point 38 shows a dropoff of more than 50 percent with respect to the autocorrelation at point 39. Since the visible crack was not discovered until approximately 200 minutes later, it can be seen that the method of this invention obtains dramatic evidence of impending fatigue failure, since point 38 is readily detectable almost twice as early as conventional crack-search techniques.

A sharply decreasing slope in the curve occurs as the surface structure approaches point 41 where visible evidence of impending fatigue appears. Thus, the slope of the curve indicates the rate of change of correlation intensity and gives a means of predicting how far the sample is from complete failure.

It will be understood that the noncontacting fatigue detection method herein disclosed is presented for the purposes of explanation and illustration and is not intended to indicate the limits of the invention, the scope of which is defined by the following claims.

We claim:

1. The method of noncontacting detection of fatigue in a test surface by a coherent cross-correlation process to determine an impending fatigue failure prior to the occurrence of any such failure comprising the steps of:
   a. producing a reference hologram representing the test surface at an earlier time $t_o$;
   b. thereafter subjecting said surface to stress for a period of time;
   c. directing coherent radiation to strike and be modulated by said surface at a later time $t_k$ after said period of subjected stress;
   d. measuring the correlation between the pattern of said modulated radiation and said hologram;
   e. repeating the steps of lettered paragraphs ($b$ through $d$) of this claim a plurality of times; and
   f. comparing a correlation measurement obtained by said repetition with previously obtained correlation measurements to detect any change in the rate of change of the correlation between said modulated radiation and said hologram, a sharp increase in said rate of change indicating an impending fatigue failure.

2. The method according to claim 1 wherein said measuring step includes cross correlation by superimposition of the modulated coherent radiation representing said test surface at a later time $t_k$ onto the recorded hologram to directly produce the cross correlation of the two patterns.

3. The method according to claim 2 wherein said coherent radiation comprises beams of laser light, wherein said hologram comprises an optic interference pattern recorded on otherwise transparent photographic film, and wherein said cross-correlation measurement is made by measuring the intensity of the light passing through said recorded hologram.

4. The method according to claim 3 wherein said correlation measuring step includes the step of converting said light intensity to a substantially DC voltage and measuring the magnitude of said voltage.

5. The method of noncontacting detection of fatigue in a test surface by a coherent cross-correlation process to determine an impending fatigue failure prior to the occurrence of any failure comprising the steps of:
   a. producing a reference hologram comprising a signal pattern representing the interference of the Fourier transform of coherent radiation representing the test surface at one point in time and a reference coherent radiation signal capable of interferring with said coherent radiation representing the test surface;

b. thereafter subjecting said surface to stress for a period of time;

c. directing coherent radiation to strike and be modulated by the test surface at a time later than said one point after said period of subjected stress;

d. generating the Fourier transform of the modulated radiation signal;

e. measuring the correlation between said test surface at said one point in time and said test surface at said later time by multiplying said hologram and said Fourier transformed modulated radiation, forming the Fourier transform of the product of said hologram and said Fourier transformed modulated radiation, and measuring the intensity of said product;

f. repeating the steps of lettered paragraphs (b through e) of this claim a plurality of times; and g. comparing a correlation measurement obtained by said repetition with previously obtained correlation measurements to detect any change in the rate of change of the correlation between said test surface and said hologram, a sharp increase in said rate of change indicating an impending fatigue failure.

6. The method according to claim 5 wherein said measuring step includes cross correlation by superimposition of the Fourier transform radiation representing said surface at said later time onto said hologram to produce a direct readout of the cross correlation between said surface and said hologram.

7. The method according to claim 6 wherein:

said coherent radiation comprises beams of laser light; wherein:

said hologram is produced by:

directing a beam of laser light to strike and be modulated by said surface;

forming the Fourier transform of the modulated coherent radiation;

directing a reference beam of laser light to intersect and interfere with said Fourier transform laser light; and recording the holographic interference pattern on otherwise transparent photographic film; and wherein:

said cross-correlation measurement is made by measuring the intensity of the laser light passing through said recorded hologram.

8. The method according to claim 7 wherein said cross correlation is accomplished by aligning a photoelectrical sensing device at a viewing angle with respect to the normal to the rear surface of said recorded hologram, substantially as shown so that said photoelectrical sensing device is aligned with the projection of a line that strikes the recorded hologram at an angle equal to the angle at which the reference beam struck the photographic film during recording of the hologram.

* * * * *